United States Patent
Guimbal et al.

(10) Patent No.: US 6,168,530 B1
(45) Date of Patent: Jan. 2, 2001

(54) DEVICE FOR COAXIALLY COUPLING TWO SHAFTS, ESPECIALLY FOR A HELICOPTER

(75) Inventors: Bruno Guimbal, Les Milles; Elio Zoppitelli, Velaux; Jean-Pierre Jalaguier, Vitrolles, all of (FR)

(73) Assignee: Eurocopter, Marignane (FR)

(*) Notice: Under 35 U.S.C. 154(b), the term of this patent shall be extended for 0 days.

(21) Appl. No.: 09/211,502

(22) Filed: Dec. 15, 1998

Related U.S. Application Data

(63) Continuation-in-part of application No. 08/770,782, filed on Dec. 20, 1996, now abandoned.

(30) Foreign Application Priority Data

Dec. 22, 1995 (FR) .................................................. 95 15388
Dec. 2, 1998 (FR) .................................................. 98 15208

(51) Int. Cl.$^7$ .............................. F16C 3/02; F16C 23/06
(52) U.S. Cl. .......................... 464/178; 384/536; 384/498
(58) Field of Search ................................. 464/99, 93, 52, 464/178; 384/535, 536, 495, 498; 403/137, 138, 141, 142, 143, 145, 148

(56) References Cited

U.S. PATENT DOCUMENTS

| | | | |
|---|---|---|---|
| 964,859 | * 7/1910 | Garman ................................. | 384/535 |
| 2,114,670 | 4/1938 | Searles . | |
| 2,138,659 | 11/1938 | Kindig . | |
| 2,572,411 | * 10/1951 | Watt ..................................... | 384/215 |
| 2,974,467 | 3/1961 | Long . | |
| 2,975,007 | * 3/1961 | Zwicker ............................... | 384/498 |
| 3,129,904 | 4/1964 | Hanson . | |
| 3,415,500 | 12/1968 | Pethis . | |
| 3,756,675 | 9/1973 | Mangiavacchi . | |
| 4,031,967 | * 6/1977 | Atherton et al. ..................... | 403/143 |
| 4,185,880 | * 1/1980 | Shiomi et al. ....................... | 308/189 |
| 4,364,613 | * 12/1982 | Mangiavacchi ...................... | 308/184 |
| 4,430,066 | 2/1984 | Benassi . | |
| 4,551,116 | 11/1985 | Krude . | |
| 4,708,499 | 11/1987 | Loiser et al. . | |
| 5,207,616 | 5/1993 | Moulinet . | |
| 5,407,386 | 4/1995 | Kish et al. . | |
| 5,468,074 | 11/1995 | Godec et al. . | |
| 5,536,090 | 7/1996 | Nisley . | |

FOREIGN PATENT DOCUMENTS

| | | |
|---|---|---|
| 567829 | 12/1958 | (CA) . |
| 298 234 | 7/1954 | (CH) . |
| 907740 | 9/1959 | (GB) . |
| 2 024 338 | 1/1980 | (GB) . |
| 62-56614 | 3/1987 | (JP) . |
| 9418070 | 8/1994 | (WO) . |

\* cited by examiner

*Primary Examiner*—Lynne H. Browne
*Assistant Examiner*—Kenneth Thompson
(74) *Attorney, Agent, or Firm*—Henderson & Sturm LLP

(57) ABSTRACT

The annular cushion 25 interposed between the fixed housing 22, 23 and a swiveling exterior surface 27 in the shape of a spherical sector with relatively large radius of curvature of the bearing block 12, 15, 16, is in a relatively rigid and incompressible material, with low coefficient of friction surface, and has a transverse section wholly adapted to the section of the annular space arranged between the inner surface of the fixed housing 22, 23 and the swiveling exterior surface of the bearing block 12, 15, 16, this annular cushion consisting of two rings 25 spaced apart and arranged on each side of the transverse median plane of the swiveling exterior surface. The fixed housing also comprises adjustment means 24 of the axial engagement amplitude of the cover 23 on the body 22 of said fixed housing, and tightening adjustment means of the fixing screws, enabling in this way the radial compression of said relatively rigid annular cushion 25 to be adjusted on said swiveling exterior surface of the bearing block 12,15, 16.

11 Claims, 3 Drawing Sheets

DEVICE FOR COAXIALLY COUPLING TWO SHAFTS, ESPECIALLY FOR A HELICOPTER

The present application is a continuation-in-part of the U.S. patent application Ser. No. 08/770,782 of Dec. 20, 1996, now abandoned.

This latter relates to a device for coaxially coupling two shafts, comprising a support at this coupling and a single system for flexibly linking the ends of these two shafts, said support including near this system a bearing block equipped with a single-row ball bearing and mounted in a fixed housing so that it can withstand slight radial and angular displacements with respect to this housing. It has been stated that in a preferential manner an annular cushion of elastic material was interposed between a swiveling exterior surface, with a relatively significant radius of curvature, of the bearing block and the fixed housing, this cushion being able to include for example two rubber rings. The value of said radius of curvature is related to the dimensions of the bearing contained inside the annular cushion.

Such a coupling device, by a self-alignment of the shafts, corrects the possible mis-alignments caused by positionning gaps between the concerned mechanical elements.

As for the fixed housing, intended to contain the annular cushion of elastic material and to hold it pressed on the bearing block, it was constituted from a globally cylindrical bearing body, closed by a cap fixed on the body for example by screws.

These basic features have been improved by taking into consideration the following requirements.

First of all, a clear need has arisen to be able to adjust more exactly the tightening of the transmission bearings in helicopters, taking account of the relatively significant deformations of the tail beams in flight, these beams supporting the corresponding transmission. This operation imposes a sufficient tightening for blocking said annular cushion and so prevent its rotation, which otherwise would lead to a premature wearing of the bearing. However, this tightening must remain limited to avoid damages to said annular cushion.

With previous devices the tightening of the transmission bearings was not able to be sufficiently exact because it was dependent upon the extremely variable compression and the deformation—significant—of the annular cushion of elastic material. Moreover, this deformation was determined by the direct abutment of the aforementioned cap against the bearing body after locking the fixing screws, and this mandatory abutment did not leave either the possibility of adjustment of this compression of the annular cushion of elastic material, nor the possibility of modifying, during maintenance and servicing operations, the initial adjustment in order to compensate for wear and play, or again to modify the initial adjustments of the bearing block in order to adapt them to different running conditions.

In other terms, there was on the one hand a genuine positional locking fault of the bearing, and on the other hand a deficiency in terms of the possibilities of adjusting the relative position of the different components and of the stresses in the bearing.

Another drawback of the annular cushion lay moreover in the fact that the elastomer or similar constituting the cushion, absorbing the noises and the vibrations, made difficult the detection of the bearing faults, like a wear or an excessive matting of the contact surfaces, or again of other abnormal operating conditions such as excessive vibration level of the coupling or the significant loss of grease.

The present improvements, which enable these drawbacks to be avoided, include the following features.

First of all, the annular cushion of elastic material has been replaced by an annular cushion of relatively rigid and incompressible material and the surface of which has a low friction coefficient, this annular cushion consisting of two rings spaced apart and arranged on each side of said transverse median plane of said swiveling exterior surface.

Since the cushion is rigid and relatively non-deformable, it is understood indeed that it must consist of two separated rings, arranged on each side of the transverse plane of symmetry of said swiveling exterior surface, failing which it would not be able to be mounted on it.

For the composition of these rings, particularly PTFE, PVC or other similar materials will be able to be used, whether they are solid, or used to constitute the coating of a rigid material, for example a metal such as steel or aluminum, this cushion possessing in any case a transverse section wholly adapted to the section of the annular space arranged between the inner surface of said fixed housing and said swiveling exterior surface of the bearing block. Another variant would be to use composite materials, constituted of metallic sheets inserted between elastomeric sheets.

All the drawbacks mentioned above, connected to the high compressibility of the elastomers and to their qualities, particularly the absorbing of vibrations, will in this way be overcome together.

In order to be able to conveniently adjust the radial compression of said relatively rigid annular cushion on said swiveling exterior surface of the bearing block, provision will moreover be made for said fixed housing to comprise means of adjusting the amplitude of axial engagement of said cover on said body, and means of adjustment of the tightening of said fixing screws.

In this way there will be no longer a dependency upon the uncontrollable compression of the elastomer of the cushion, and on the other hand it will be possible to exactly control this radial pressure exerted on the annular cushion, for example as a function of the manufacturing tolerances, and even to modify the adjustments during the lifetime of the coupling device, in order to take account, particularly, of wear, this by progressively absorbing the relatively significant axial clearances, initially provided between the cover and the housing body.

The reason for which these axial clearances must be relatively significant lies in the fact that, as mentioned above, the radius of curvature of the swiveling exterior surface of the bearing block is relatively large, since it is a matter of compensating only small possible misalignments of the shafts in relation to the bearing axis.

The result is that the appearance of a small radial clearance, for example in the bearing, will manifest itself in a relatively significant axial displacement of the cover of the fixed housing relative to its body. That will be better understood by the following, but it can also be noted here that it is also the relative significance of the radius of curvature of said swiveling exterior surface which makes appropriate the implementation of an annular cushion in PTFE or with a PTFE coating or other material with low coefficient of friction, in order to avoid its wedging, on dismantling, between the swiveling surface in question and the inner surface of the fixed housing.

It has been seen above that the rigid annular cushion had to consist of two separated rings in order to be able to be mounted on said swiveling exterior surface.

According to an additional characteristic of the present invention, the distance between these two rings is such that, seen from the center (C) of symmetry of said swiveling exterior surface, the angle ($\phi$) between these two rings is greater than the wedging angle (α) of these two rings between said swiveling surface and said inner surface of the fixed housing.

This is indeed the necessary condition for the two rings to be able to be dismantled without being wedged by friction between the two aforementioned surfaces.

Given that the two rings are in PTFE or are coated with PTFE or any other material with a small or very small coefficient of friction, the wedging angle α is very small, and it will therefore be the same for the angle φ, which signifies that the distance between the two rings will be able to be very small. This enables all its compactness to be retained during mounting, in spite of the division of the annular cushion into two rings.

On these common bases, the invention can be implemented according to different embodiments, as far as the composition of the adjustment and tightening means mentioned above are concerned.

In a first embodiment, the device comprises adjustment and tightening means constituted as a whole by a set of screws securing the cover on the body of the housing by extending around said bearing block, the tightening of these screws being adjusted by means of a torque limiter.

In this way the amplitude of the axial engagement of the housing cover on the housing body will be able to be adjusted at the same time, and the radial pressure exerted, under the action of assembly and the conical centering thus carried out, by the annular cushion on the swiveling exterior bearing surface, all without the body of the housing having in relation to the cover an axial abutment effect.

This embodiment will be preferred for an application to helicopter transmissions, for it enables radial clearances to be limited to the maximum and to reduce them very easily, without any dismantling, in case they have increased due to wear or matting of the parts in contact, due to the vibrations.

In other cases and in a second embodiment of the device, separate adjustment and tightening means are used, the adjustment means of the amplitude of the axial engagement of said cover on said body including a stacking of peelable wedges clamped between a flange of the housing body and a flange of its cover, while the tightening means include a set of screws securing the cover on the body of the housing by passing through said flanges.

To advantage again, provision can be made for the space arranged between the two rings constituting the annular cushion to form a sealed grease passage between an external greaser and said bearing.

According to one embodiment, said bearing may be contained in a seal carrying housing, these seals being mounted, on each side of said bearing, to provide a seal between said housing and rotating bearing surfaces of the coupling, in which case said annular rigid cushion is interposed between said fixed housing and a swiveling exterior surface of the seal carrying housing.

According to another embodiment, said rigid annular cushion is interposed between said fixed housing and a swiveling exterior surface of an outer race of the bearing, in which case said bearing comprises directly its own seals on each side of the row of balls, between its outer race and its inner race.

According to another important feature of the invention, such a device may further be one wherein said flexible linking system is mounted between the end of one of the shafts and a coupling length which is fixed on a coupling sleeve fixed rigidly to the end of the other shaft, and wherein said bearing block support is arranged at the junction between said length and said sleeve.

In the application to helicopters, it will be further advantageous to provide for one of the shafts to be a subcritical transmission shaft connected to the main transmission shaft of a helicopter, the other shaft being a supercritical shaft connected to its rear transmission box, the reverse arrangement also being possible.

Two embodiments of the invention will now be described by way of nonlimiting examples with reference to the figures of the appended drawings in which.

Figure 1:
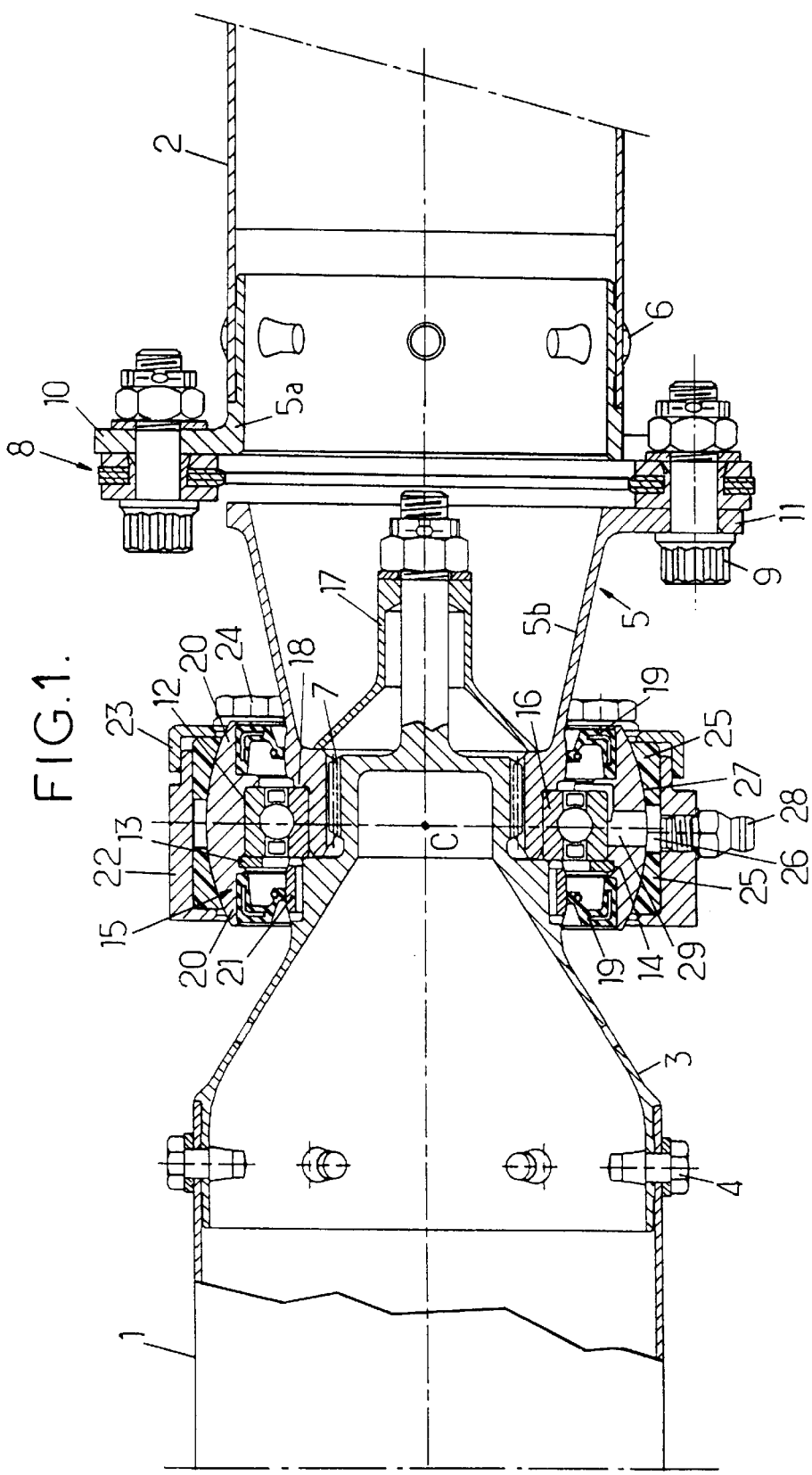
FIG. 1 is a view in axial section of a coupling device between two shafts of a helicopter rear transmission, more particularly the power transmission between the main transmission box driving the lift rotor of a helicopter, and the rear transmission box driving the tail counter-torque rotor.

In the first embodiment shown in axial section in FIG. 1, the two shafts have been referenced 1 and 2, the shaft 1 being for example a subcritical transmission shaft connected to the main transmission box of a helicopter, and the shaft 2 a supercritical shaft connected to its rear transmission box. At the end of the front shaft 1 to be coupled to the corresponding end of the shaft 2 a conical coupling sleeve 3 is provided and fixed on the shaft 1 by a ring of bolts 4 (which could be replaced by rivets). In a similar way, at the end of the shaft 2 a coupling sleeve 5 is provided. This sleeve consists of a cylindrical length 5a connected by a ring of rivets 6 to the end of the shaft 2, and a conical length 5b fixed to the end of the conical sleeve 3 by splines 7. As for the two lengths 5a and 5b, they are elastically connected to each other by a single flexible linking system 8 of the "Thomas coupling" type, known in this technical field by the name "flector", and fixed by a ring of bolts 9 between a flange 10 of the length 5a and a flange 11 of the length 5b. (It is recalled here as a reminder that a flector is a flexible rotation coupling which may contain one or more flexible metal strips).

The support for the coupling thus obtained comprises in this embodiment a bearing block with a single-row ball bearing, the outer race 12 of which is held, by a collar 13, in an inner annular groove 14 of a seal carrying housing 15 with a swiveling exterior surface 27. The inner race 16 of said row of ball bearings is held against a peripheral shoulder 18 of the end of the length 5b of the sleeve 5 by axially clamping a cap 17 onto the end of the sleeve 3.

Represented as 19 are two conventional reinforced annular seals capable of sealing the bearing with respect to the outside and for this purpose fixed under shoulders 20 of the seal carrying housing 15, the lips of these seals rubbing on the rotating bearing surfaces 21 of the coupling.

Figure 2:
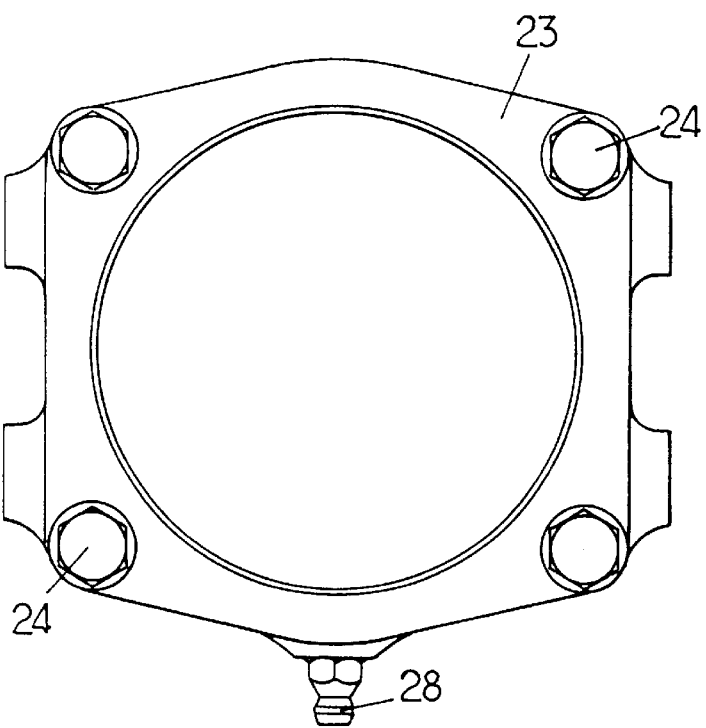
FIG. 2 is a right hand side view of the housing cover.

An annular cushion of rigid synthetic material, for example of PTFE or in metal coated with PTFE (polytetrafluorethylene) is interposed between the seal carrying housing 15 and a fixed housing, the latter consisting of a bearing body 22 closed by a cap 23 fixed on the body 22 by axial clamping screws 24 (see also FIG. 2); said rigid annular cushion consists of two rings 25 spaced slightly apart and arranged on each side of the transverse plane of symmetry containing the center of symmetry C of the swiveling surface 27 as well as the center of the balls of the bearing, these rings being compressed between the bottom of the bearing body 22 and this swiveling exterior surface 27 of the seal carrying housing 15.

This surface 27 is swiveling in order to enable a slight angular offset of the fixed housing 22, 23 relative to the axis of the shaft 1. To achieve this, a spherical surface 27 may be provided. It is possible, thanks to such a surface, to allow the stresses in the bearings and the structure to be relaxed when the fixed housing is installed with incorrect alignment relative to the shaft 1, for example caused by gaps in the positionning of the bearing block supports.

It should be noted that the space 26 provided between the rings 25 provides, thanks to these rings, a sealed passage for the grease which comes from an external greaser 28 and is directed onto the bearing, the housing 15 having a radial duct 29 facing the greaser.

Figure 1A:
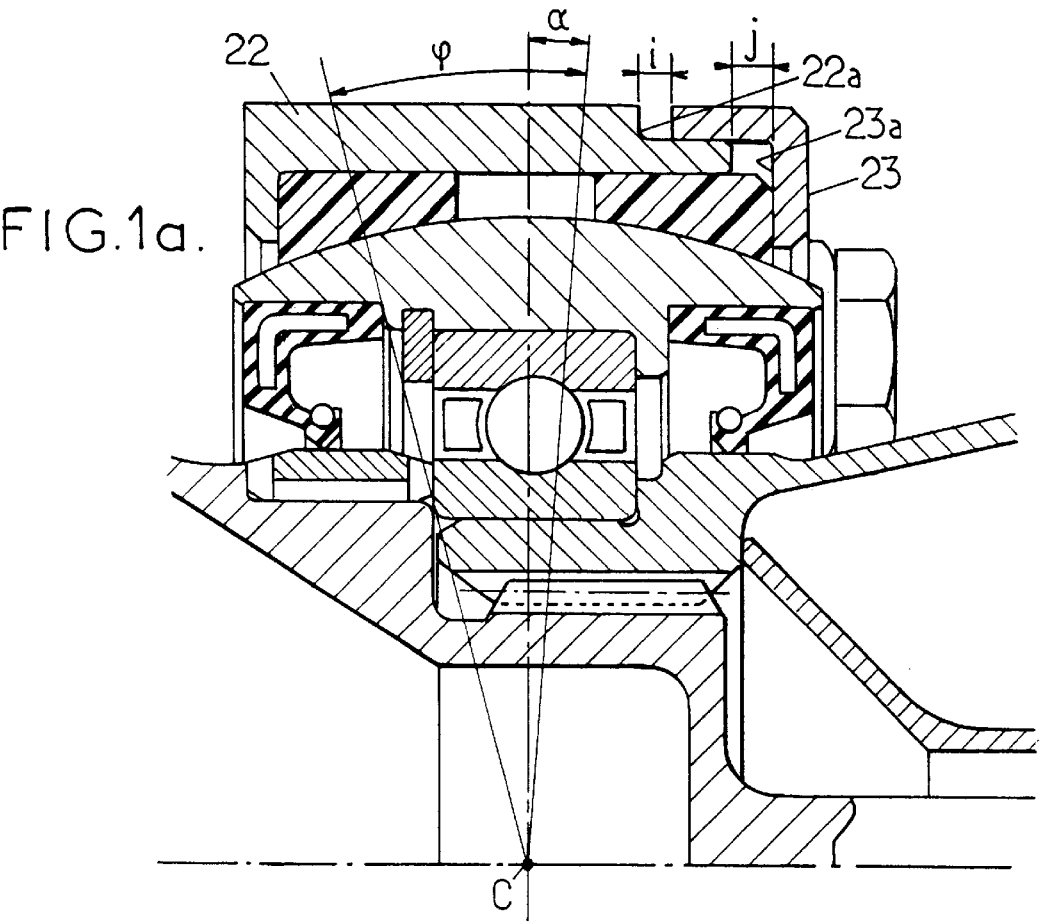
FIG. 1a is a view in partial axial section of the housing.

It is also noted that in this embodiment there exists initially (after the first mounting) a relatively significant axial clearance i between the edge of the cover 23 and a shoulder 22a of the housing body, and another axial clearance j, of the same order of magnitude, between the end of the body 22 and the bottom 23a of the cover 23 (FIG. 1a).

Thanks to these arrangements and as already explained above, the radial pressure exerted on the swiveling surface will be able to be adjusted exactly, despite the manufacturing tolerances, and the clearances appearing during running to be compensated.

Figure 3:
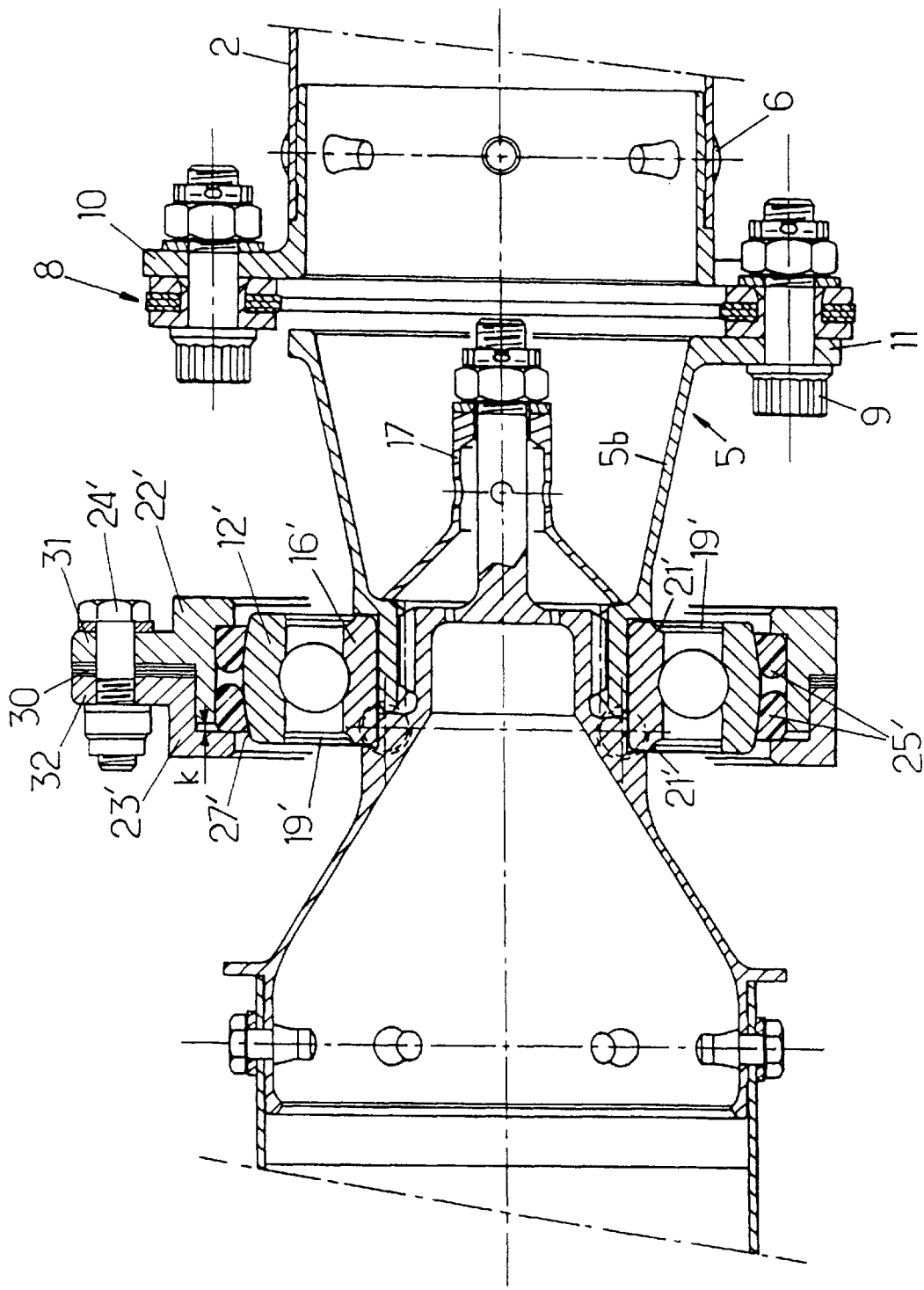
FIG. 3 is a view in axial section of another embodiment of the device for coaxially coupling two shafts.

The embodiment disclosed with reference to FIG. 3 can still be used for helicopters if the cost and weight of the device are not critical.

The essential difference with the previous embodiment, independently of the means of adjustment and clamping, lies in the absence of the seal carrying housing 15, the seals of the bearing 12', 16' referenced as 19', being fixed directly to the outer race 12', their lips being in contact with the peripheral bearing surfaces 21' of the inner race 16'.

In this case, it is the outer race 12' which may have a spherical swiveling surface 27' in contact with the PTFE or similar rings 25'. The fixed housing containing the rings 25' and the bearing may, as in the first embodiment, consist of a bearing body 22' closed by a cap 23' thanks to axial clamping screws 24'. The originality of this mounting, from the points of view of adjustment of the axial positioning of the cover 23', and its clamping on the housing body 22', lies in the fact that a stack of peelable wedges 30 is inserted between the flanges 31 and 32, respectively of the body 22' and of the cover 23', which are passed through by the screws 24', a clearance k being arranged internally in order to prevent a direct abutment of the cover of the housing body.

Thus it will again be possible to adjust conveniently the initial axial position of the cover 23' in relation to the housing body 22', and therefore to adjust exactly the radial pressure exerted by the rigid annular cushion 25'—25' on the ring 12', then, during running, to compensate the radial clearances due to wear or to matting of the components in contact, by peeling more or less the stack 30.

In the two embodiments which have just been described, the mounting of the coupling device is simplified, because so long as the caps 23 and 23' are merely drawn together, the bearing can swivel and aligns itself on the shaft when being fitted. This limited self-aligning nature constitutes an essential feature of this assembly. When mounting has finished, the caps will close the whole assembly by compressing the rigid rings 25 and 25'; the swivel is then locked and becomes a relatively stiff mounting, radially speaking, and perfectly withstanding corrosion and risks of seizure.

During running, the radial and angular clearance of the mounting of the bearing allows it to accommodate deformations of the structure which carries the fixed housing, as well as bending of the shafts, especially the shaft opposite the one carrying the "flector". As the running force is almost zero, correct mounting and good quality seals allow an extremely long life to be anticipated.

Other advantages of the invention lie in the simplicity of the device, which calls upon just one flector between the two shafts, and upon a single bearing without pre-load. The aforementioned self-alignment avoids having to align the structure or having to undertake additional machining or wedging. The structure itself need not be particularly rigid. Finally, there is a substantial mass saving by comparison with the devices which call upon two flectors, between a central sleeve supported by a bearing and respectively the corresponding ends of the two shafts to be coupled.

As already stated, the invention finds a particularly advantageous application in helicopters for transmitting power between the main transmission box driving the lift rotor and the rear transmission box driving the counter-torque tail rotor. In particular, the invention allows to provide an as short as possible length 5b, i.e. to reduce the distance between the bearing surface of the bearing block and the flexible linking system (flector 8). In such a way, the flector is more efficacious, which reduces the forces transmitted to the various elements of the bearing block.

It should be noted that the annular cushion of rigid material could be made as a single piece instead of consisting of two rings 25 or 25', in which case this component could have vents passing through it for the passage of grease.

What is claimed is:

1. A device for axially coupling two shafts comprising a support at this coupling and a flexible linking system between the ends of said shafts, said support including near said flexible linking system a bearing block equipped with a single row ball bearing and mounted in a fixed housing of generally cylindrical shape with the intermediary of an annular cushion interposed between said fixed housing and a swiveling exterior surface in the shape of a spherical sector with relatively large radius of curvature of the bearing block, this swiveling exterior surface having a transverse median plane of symmetry perpendicular to the axis of two said shafts, a device wherein said fixed housing comprises a cover suitable to be engaged in an axially sliding manner and secured onto a body by axially extending fixing screws, wherein said annular cushion is in a relatively rigid and incompressible material, with low coefficient of friction surface, and has a transverse section wholly adapted to the section of the annular space arranged between the inner surface of said fixed housing and said swiveling exterior surface of the bearing block, this annular cushion consisting of two rings spaced apart and arranged on each side of said transverse median plane of said swiveling exterior surface, and said fixed housing comprises adjustment means of the axial engagement amplitude of said cover on said body, and tightening adjustment means of said fixing screws, enabling in this way the radial compression of said relatively rigid annular cushion to be adjusted on said swiveling exterior surface of the bearing block.

2. A coaxial coupling device according to claim 1, wherein relatively significant axial clearances are provided between the cover and the body of said fixed housing.

3. A coaxial coupling device according to claim 1 or 2, wherein the space between the two rings constituting the annular cushion is such that, viewed from the center of symmetry of said swiveling exterior surface, the angle between these two rings is greater than the wedging angle of the two rings between said swiveling surface and said inner surface of the fixed housing.

4. A coaxial coupling device according to claim 1, including adjustment and tightening means constituted globally by a set of screws securing the cover onto the body of the housing by extending around said bearing block, the tightening of these screws being adjusted by means of a torque limiter.

5. A coaxial coupling device according to claim 1, including separate adjustment and tightening means, the adjustment means of the axial engagement amplitude of said cover onto said body including a stack of peelable wedges clamped between a flange of the housing body and a flange of its cover, while the tightening means include a set of screws securing the cover onto the body of the housing by passing through said flanges.

6. An axial coupling device according to claim 1, wherein the two said rings form between them a space forming a sealed grease passage between an external greaser and said bearing.

7. An axial coupling device according to claim 1, wherein said bearing is contained in a seal carrying housing, these seals being mounted, on each side of said bearing, in order to ensure sealing between said housing and rotating bearing surfaces of the coupling.

8. An axial coupling device according to claim 5, wherein said rigid annular cushion is interposed between said fixed housing and a swiveling exterior surface of the outer race of the bearing.

9. An axial coupling device according to claim 8, wherein said bearing comprises directly its own seals, on each side of the row of balls, between its outer race and its inner race.

10. An axial coupling device according to claim 1, wherein said flexible linking system is mounted between the end of one of the shafts and a coupling length, which is wedged onto a coupling sleeve rigidly fixed to the end of the other shaft, and wherein said bearing block support is placed at the junction between said length and said sleeve.

11. An axial coupling device according to claim 1, wherein one of the shafts is a subcritical transmission shaft connected to the main transmission box of a helicopter, the other shaft being a supercritical shaft connected to its rear transmission box, or vice versa.

* * * * *